(12) United States Patent
Christensen et al.

(10) Patent No.: US 12,044,470 B2
(45) Date of Patent: Jul. 23, 2024

(54) SYSTEM AND METHOD FOR CONTROL OF FEED COMPRESSORS IN AN RNG RECOVERY FACILITY FOR BIOGAS OR LANDFILL GAS

(71) Applicant: WM INTELLECTUAL PROPERTY HOLDINGS, L.L.C., Houston, TX (US)

(72) Inventors: Derek Christensen, Appleton, WI (US); Jon Denault, Herscher, IL (US); Greg Miles, Villa Park, IL (US); Keith Ott, Genesco, NY (US); Douglas Lee Palmer, Jr., Dacula, GA (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

(21) Appl. No.: 18/441,852

(22) Filed: Feb. 14, 2024

(65) Prior Publication Data
US 2024/0183609 A1    Jun. 6, 2024

Related U.S. Application Data

(62) Division of application No. 18/243,386, filed on Sep. 7, 2023.
(Continued)

(51) Int. Cl.
*B01D 53/047*    (2006.01)
*B01D 53/04*    (2006.01)
(Continued)

(52) U.S. Cl.
CPC ............ *F25J 3/0209* (2013.01); *B01D 53/04* (2013.01); *B01D 53/22* (2013.01); *F25J 3/0257* (2013.01);
(Continued)

(58) Field of Classification Search
CPC ........ F25J 3/0209; F25J 3/0257; F25J 3/0266; F25J 2205/72; F25J 2205/80;
(Continued)

(56) References Cited

U.S. PATENT DOCUMENTS 3,732,034 A    5/1973    Reid et al.
4,191,511 A    3/1980    Stewart et al.
(Continued)

FOREIGN PATENT DOCUMENTS

CN    204494897 U    7/2015
CN    112502953    3/2021
(Continued)

OTHER PUBLICATIONS

Graniefuel Engineering; Alliance Dairies' RNG Plant; 2023; 4 pages.
(Continued)

*Primary Examiner* — Frank M Lawrence, Jr.
(74) *Attorney, Agent, or Firm* — Greenberg Traurig LLP

(57) ABSTRACT

A system and method for recovering high-quality biomethane (RNG) from biogas sources is provided. The gas stream is compressed and liquids are separated from the gas stream at elevated pressure and reduced temperature. The compressing is performed using a plurality of compressors operating in parallel with common control set points. The system and method improve upon conventional practices and yield a biomethane product which meets strict gas pipeline quality specifications. Additionally, the system and method are an improvement to the overall methane recovery efficiency for biogas processing facilities.

8 Claims, 5 Drawing Sheets

Related U.S. Application Data

(60) Provisional application No. 63/404,479, filed on Sep. 7, 2022.

(51) Int. Cl.
*B01D 53/22* (2006.01)
*F25J 3/02* (2006.01)

(52) U.S. Cl.
CPC ....... *F25J 3/0266* (2013.01); *B01D 2256/245* (2013.01); *B01D 2257/30* (2013.01); *B01D 2257/504* (2013.01); *B01D 2258/05* (2013.01); *F25J 2205/72* (2013.01); *F25J 2205/80* (2013.01); *F25J 2210/66* (2013.01); *F25J 2230/30* (2013.01)

(58) Field of Classification Search
CPC .... F25J 2210/66; F25J 2230/30; B01D 53/04; B01D 53/047; B01D 53/0476; B01D 53/22; B01D 53/229; B01D 2256/245; B01D 2257/30; B01D 2257/504; B01D 2258/05
USPC .................. 95/51, 90, 96, 143; 62/600, 606; 585/802, 818, 820, 821
See application file for complete search history.

(56) References Cited

U.S. PATENT DOCUMENTS

| | | | |
|---|---|---|---|
| 5,213,593 A * | 5/1993 | White, Jr. .......... | B01D 53/0462 95/99 |
| 6,139,280 A | 10/2000 | Holt et al. | |
| 6,217,288 B1 | 4/2001 | Mirsky et al. | |
| 7,293,415 B2 | 11/2007 | Hoffmann et al. | |
| 8,211,211 B1 * | 7/2012 | Knaebel ................. | B01D 53/75 95/122 |
| 9,945,608 B2 * | 4/2018 | Ploeger ................... | C10L 3/101 |
| 10,678,272 B2 | 6/2020 | Lattanzio et al. | |
| 11,776,670 B1 | 10/2023 | Walk et al. | |
| 2002/0020175 A1 | 2/2002 | Street et al. | |
| 2003/0053906 A1 | 3/2003 | Itou et al. | |
| 2008/0141714 A1 * | 6/2008 | Cartwright ........... | B01D 53/229 62/619 |
| 2015/0204591 A1 | 7/2015 | Burg et al. | |
| 2016/0166980 A1 * | 6/2016 | Pan ........................ | B01D 51/10 96/7 |
| 2017/0283292 A1 * | 10/2017 | Kim ..................... | B01D 53/226 |
| 2018/0112142 A1 | 4/2018 | Foody et al. | |
| 2019/0224617 A1 | 7/2019 | Mitariten | |
| 2021/0012254 A1 | 1/2021 | Campbell et al. | |
| 2021/0094894 A1 * | 4/2021 | Whitmore .............. | G06Q 40/10 |
| 2021/0290177 A1 | 9/2021 | Novak, Jr. et al. | |
| 2021/0296008 A1 | 9/2021 | Novak, Jr. et al. | |
| 2021/0327187 A1 | 10/2021 | Wisniewski | |
| 2021/0328801 A1 | 10/2021 | Sly et al. | |
| 2021/0335074 A1 | 10/2021 | Cowles et al. | |
| 2021/0335458 A1 | 10/2021 | McMullen | |
| 2021/0338102 A1 | 11/2021 | Palacios et al. | |
| 2021/0375084 A1 | 12/2021 | Aubrey et al. | |
| 2023/0061958 A1 | 3/2023 | Al Hosani et al. | |
| 2024/0085102 A1 | 3/2024 | Christensen et al. | |

FOREIGN PATENT DOCUMENTS

| | | |
|---|---|---|
| CN | 115111673 A | 9/2022 |
| WO | 2021/207240 | 10/2021 |
| WO | 2024/054552 | 3/2024 |

OTHER PUBLICATIONS

Mathai, George et al.; HartEnergy: Controlling Reciprocating Compressors; Jul. 1, 2008; 10 pages.
Perennial Energy; Biogas Processing Systems; 2015; 2 pages.
Access Protocols for All State Offices and Facilities; Nov. 18, 2020; https://dbm.maryland.gov/employees/documents/covid-19%20building%20entry%20protocol.pdf; 2 pages.
Crowdblink, Employee Health Screening App: Daily Covid-19 Assessments, Nov. 19, 2021.
European Patent Office; PCT International Search Report, issued in connection to application No. PCT/US2023/032164; 7 pages; Apr. 9, 2024; Europe.
European Patent Office; PCT Written Opinion of the International Searching Authority, issued in connection to application No. PCT/US2023/032164; 13 pages; Apr. 9, 2024; Europe.
Goevo, Return to work safely and quickly with the Personal Protective App (PPA), Dec. 31, 2021.
Higley, Card Access Data Integration and Reporting During Covid-19, Aug. 31, 2020.
Microsoft, Use the Employee Return to the Workplace app, Aug. 3, 2021.
Returnsafe, Health Screening Prior to Entering the Workplace, Nov. 19, 2021.
Ryerson, Introducing RyersonSafe for health screening process for all students, faculty, staff, visitor, Jul. 12, 2021.
Servicenow, Configure Employee Health Screening, Dec. 31, 2021.
USCF, Daily Health Screening, Nov. 19, 2021; 3 pages.
VMware, Employee Experience When They Receive a Health Attestation Notification in Workspace ONE Intelligent Hub App, Sep. 1, 2021.
Wissenschaftszentrum Nordrhein-Westfalen; Analysis and Evaluation of the Possible Uses of Biomass; Aug. 1, 2005; http://www.biogaseinspeisung.de/download/Endberichet-Band3_FhG-IUSE.pdf; 236 pages; Germany.

* cited by examiner

SYSTEM AND METHOD FOR CONTROL OF FEED COMPRESSORS IN AN RNG RECOVERY FACILITY FOR BIOGAS OR LANDFILL GAS

RELATED APPLICATIONS

This application is a divisional application and claims the benefit, and priority benefit, of U.S. patent application Ser. No. 18/243,386, filed Sep. 7, 2023, which claims the benefit and priority benefit of U.S. Provisional Patent Application Ser. No. 63/404,479, filed Sep. 7, 2022, the disclosure and contents of which are incorporated by reference herein in their entirety.

BACKGROUND

Field of Invention

The presently disclosed subject matter relates generally to control of feed compressors in a renewable natural gas (RNG) recovery facility for biogas or landfill gas.

Description of the Related Art

Biogas is gas produced through the decomposition of organic matter in facilities such as solid waste landfills, wastewater treatment plants, or other anaerobic digesters. Biogas is composed primarily of methane and carbon dioxide, but also contains lesser amounts of other compounds. The gas is typically either flared to thermally destruct the combustible compounds or is beneficially utilized for its methane content. Typical beneficial use applications include combustion of the biogas for industrial heating applications, combustion of the biogas for electricity generation, or processing the biogas to generate a methane (biomethane) product that can be injected into natural gas pipelines or used in compressed natural gas (CNG) or liquefied natural gas (LNG) vehicle fuel applications.

Biomethane which is injected into natural gas pipelines is commonly referred to as renewable natural gas (RNG) and is a pipeline-quality gas that is fully interchangeable with conventional natural gas and thus can be used in natural gas vehicles. RNG is essentially biogas, the gaseous product of the decomposition of organic matter, that has been processed to purity standards.

Municipal solid waste landfills are the largest generators and sources of biogas in the United States. Typical landfills in the United States produce around 800-8,000 SCFM of biogas. The composition and rate of production of the biogas is largely dependent on the fresh feed rate, existing volume, and composition of organic material; fresh feed rate, existing volume, and composition of other substances; operating temperature; moisture content; oxygen content; bacterial makeup; length of time spent digesting; and the design and operation of the digestion and gas extraction facilities. For example, the disposal of cosmetics and deodorants within household waste leads to siloxanes in the biogas, the presence of refrigerants leads to halogenated hydrocarbons in the biogas, and the operation of the landfill gas collection system under vacuum in an effort to limit fugitive emissions often incidentally leads to the presence of nitrogen and oxygen in the biogas.

Biogas beneficial use applications which involve processing the gas to generate a biomethane product for injection into natural gas pipelines require that the biomethane product be sufficiently purified from compounds that may jeopardize the integrity of pipeline systems, lead to damage of downstream equipment, or would pose risks to human or environmental health. As such, there is a need to design advanced biogas processing facilities with sufficient robustness to handle a wide range of potential inlet gas compositions and contaminant levels while satisfying strict product purity requirements.

Conventional means for processing biogas for biomethane production involve separation of methane and other compounds within the gas stream by passing the gas stream through various combinations of single-use adsorbent or scavenger beds, pressure-swing adsorption (PSA) packages, temperature-swing adsorption (TSA) packages, membranes, physical solvent-based absorbers, and chemical solvent-based absorbers.

Historically, conventional RNG facilities have had certain limitations with respect to operability and reliability.

Improvements in this field of technology are therefore desired.

SUMMARY OF THE INVENTION

In accordance with the presently disclosed subject matter, various illustrative embodiments of a system and method for recovering methane from a biogas-generating source are described herein.

In certain illustrative embodiments, a method for recovering methane from a biogas-generating source is provided. At least one gas stream comprising a biogas from a biogas-generating source can be accessed. Sulfur can be removed from the gas stream. For purposes of removal of methane from biogas, the gas stream can be compressed to a pressure of at least 50 psig. For purposes of removal of $H_2S$, the gas stream can be compressed to a pressure of at least 5 psig. The gas stream can be chilled to less than 60 deg F. The gas stream can be compressed and liquids can be separated from the gas stream at elevated pressure and reduced temperature, wherein the compressing can be performed using a plurality of compressors operating in parallel with common control set points. A majority of trace contaminants can be separated from the gas stream through preferential adsorption of the trace contaminants. A majority of the carbon dioxide can be separated from the gas stream through preferential permeation of carbon dioxide through membranes. Nitrogen and oxygen can be separated from the gas stream through preferential adsorption of methane. Adsorbed methane can be released through depressurization. Adsorbed methane can be further released through use of vacuum compressors. A methane product can be recovered from the gas stream.

In certain aspects, each compressor in the plurality of compressors is located on a shared common discharge header, and the compressor capacity for each compressor can be based on a discharge pressure control from a pressure transmitter located on the shared common discharge header. The gas stream can be passed through an inlet blower prior to removing sulfur from the gas stream, and the inlet blower can be operated on discharge compressor control from the plurality of compressors. The gas stream can be directed to a landfill gas flare using one or more inlet blowers prior to removing sulfur from the gas stream. Gas samples taken from a plurality of locations in the process can be routed to a common set of monitoring instrumentation. After separating the majority of the carbon dioxide from the gas stream to produce a tailgas stream, the tailgas stream can be directed to a thermal oxidizer and the methane content in the tailgas stream can be monitored. One or more equipment units in the process can be depressurized to a common vacuum header. The entire methane product stream can be directed to a methane flare having a continuous pilot.

In accordance with the presently disclosed subject matter, various illustrative embodiments of a system and method for control of feed compressors in an RNG recovery facility for biogas or landfill gas are also disclosed herein.

In certain illustrative embodiments, a method of controlling compressor operations for a plurality of feed compressors in a facility for treating biogas to recover renewable natural gas is provided. The plurality of feed compressors can be aligned to operate in parallel on a shared common discharge header. The compressor capacity can be regulated for each feed compressor using a pressure transmitter located on the shared common discharge header. The regulating can be performed by a computer-based control system using supervisory control and data acquisition. The shared common discharge header can be maintained at a header discharge pressure that is within a predetermined deadband boundary range. The maintaining can be performed by a computer-based control system using supervisory control and data acquisition. A compressor slide valve on each feed compressor can be maintained at a stationary position. The header discharge pressure can be monitored, and if the header discharge pressure goes outside of the predetermined deadband boundary range, the position of the compressor slide valve on each feed compressor can be changed or moved from the stationary position to a position that increases or decreases gas flow to the feed compressor. The changing or moving can be performed by a computer-based control system using supervisory control and data acquisition. A compressor slide valve on each feed compressor can be maintained at a first position. The position of the compressor slide valve on each feed compressor can be changed from the first position to a second position after a predetermined period of time to jog the valve and prevent sticking, and then immediately returned to the first position. The plurality of feed compressors can include a first feed compressor and a second feed compressor. The position of the compressor slide valve on the first feed compressor can be changed from the first position to the second position. The position of the compressor slide valve on the second feed compressor can be from the first position to the second position. The changing of the position of the compressor slide valve for the first feed compressor and the second feed compressor can be in opposite directions, to counter any flow disruption and not affect overall header discharge pressure.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

The presently disclosed subject matter relates to a system and method for recovering high-quality biomethane (RNG) from biogas sources. The system and method improve upon conventional practices and yield a biomethane product which meets strict gas pipeline quality specifications. Additionally, the system and method are an improvement to the overall methane recovery efficiency for biogas processing facilities.

As used herein, the phrase "biogas processing facility" shall not be limited to simply a single building, plant or other like facility, but shall also mean any collection of such buildings, plants or facilities, or any solid waste landfills, wastewater treatment plants, or other anaerobic digesters, as used to accomplish the subject matter described herein.

Figure 1:
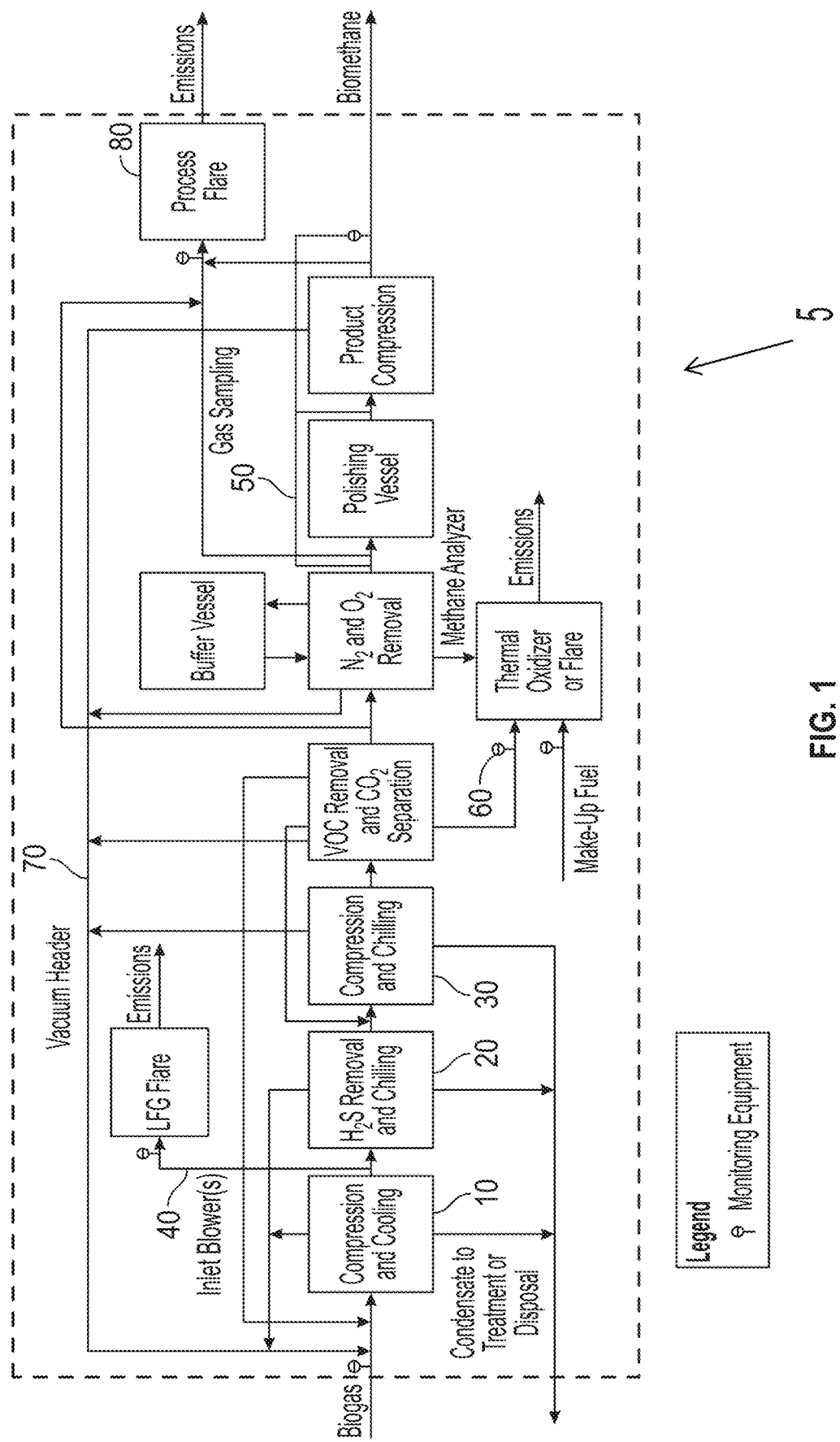
FIG. 1 is an example of a system and method for recovering high-quality biomethane (RNG) from biogas sources in accordance with an illustrative embodiment of the presently disclosed subject matter.

An illustrative embodiment of a system and method 5 for recovering high-quality biomethane (RNG) from biogas sources is shown in FIG. 1 herein. In certain illustrative embodiments, the system and method 5 can involve, without limitation, the follow aspects: (a) accessing at least one gas stream comprising a biogas from a biogas-generating source; (b) removing sulfur from the gas stream; (c) for purposes of removal of methane from biogas, compressing the gas stream to a pressure of at least 50 psig, or for purposes of removal of $H_2S$, compressing the gas stream to a pressure of at least 5 psig; (d) chilling the gas stream to less than 60 deg F.; (e) compressing the gas stream and separating liquids from the gas stream at elevated pressure and reduced temperature, wherein the compressing is performed using a plurality of compressors operating in parallel with common control set points; (f) separating a majority of trace contaminants from the gas stream through preferential adsorption of the trace contaminants; (g) separating a majority of the carbon dioxide from the gas stream through, for example, preferential permeation of carbon dioxide through membranes; (h) separating nitrogen and oxygen from the gas stream through, for example, preferential adsorption of methane; (i) releasing adsorbed methane through depressurization into a pressure vessel; (j) further releasing adsorbed methane through use of vacuum compressors; (k) recovering a methane product from the gas stream for beneficial use; and (l) monitoring material and energy inputs and outputs from a biogas processing facility, wherein at least some of steps (b)-(k) occur in the biogas processing facility.

It should be noted that the system and method 5 of FIG. 1 may be performed in different orders and/or sequences as dictated or permitted by the equipment described herein, and any alternative embodiments thereof. Other arrangements of the various "steps" and equipment can be utilized. In addition, not all "steps" or equipment described herein need be utilized in all embodiments. It should also be noted that certain particular equipment choices and/or arrangements of equipment and/or "steps" are preferred embodiments, and are materially distinguishable from and provide distinct advantages over previously known technologies.

Further details regarding additional beneficial features from the presently disclosed system and method 5, in certain illustrative embodiments, are provided below.

Increase Capacity of Inlet Blowers to Handle Full Landfill Gas Volume

In certain illustrative embodiments, one or more inlet blowers 40 can be utilized, as shown at the inlet to the step labeled "LFG flare" in FIG. 1. LFG is an acronym for landfill gas. The inlet blowers 40 can be sized to handle the full potential volume of gas from the landfill. This avoids the need to operate the flare blower and avoids potential feedstock losses associated with minimum flow requirements for the flare blower. This leads to improved RNG production, improved run-time, control competition and issues, and reduced maintenance for the facility.

Redundant Sampling Locations

In certain illustrative embodiments, gas sampling 50 can be provided at multiple locations within the process layout with common instrumentation, as shown near the step labeled "Polishing vessel" in FIG. 1. Automated valves can be used to route gas samples from various locations within the process to a single set of instruments. This leads to reduced instrumentation cost, reduced cost for exhausting media, reduced run-time on product compressor and reduced electric cost.

Addition of Tailgas Methane Analyzer

In certain illustrative embodiments, a methane analyzer 60 can be added to the tailgas stream, as shown near the step labeled "Thermal oxidizer or flare" in FIG. 1, to allow monitoring of the methane slip to the flare. This leads to improved plant controls and efficiency.

Addition of Vacuum Header

In certain illustrative embodiments, a vacuum header 70, as shown in FIG. 1, can run through the facility to allow depressurization of equipment to the suction or vacuum side of the process. This leads to reduced methane losses from the facility and improved run-time.

Full-Scale Process Flare for RNG Facility

In certain illustrative embodiments, a dedicated process flare 80 with continuous pilot, as shown near the step labeled "Process flare" in FIG. 1, can be utilized to handle the full volume of off-gas from the RNG facility. This leads to improved reliability and run-time for the facility.

Figure 3:
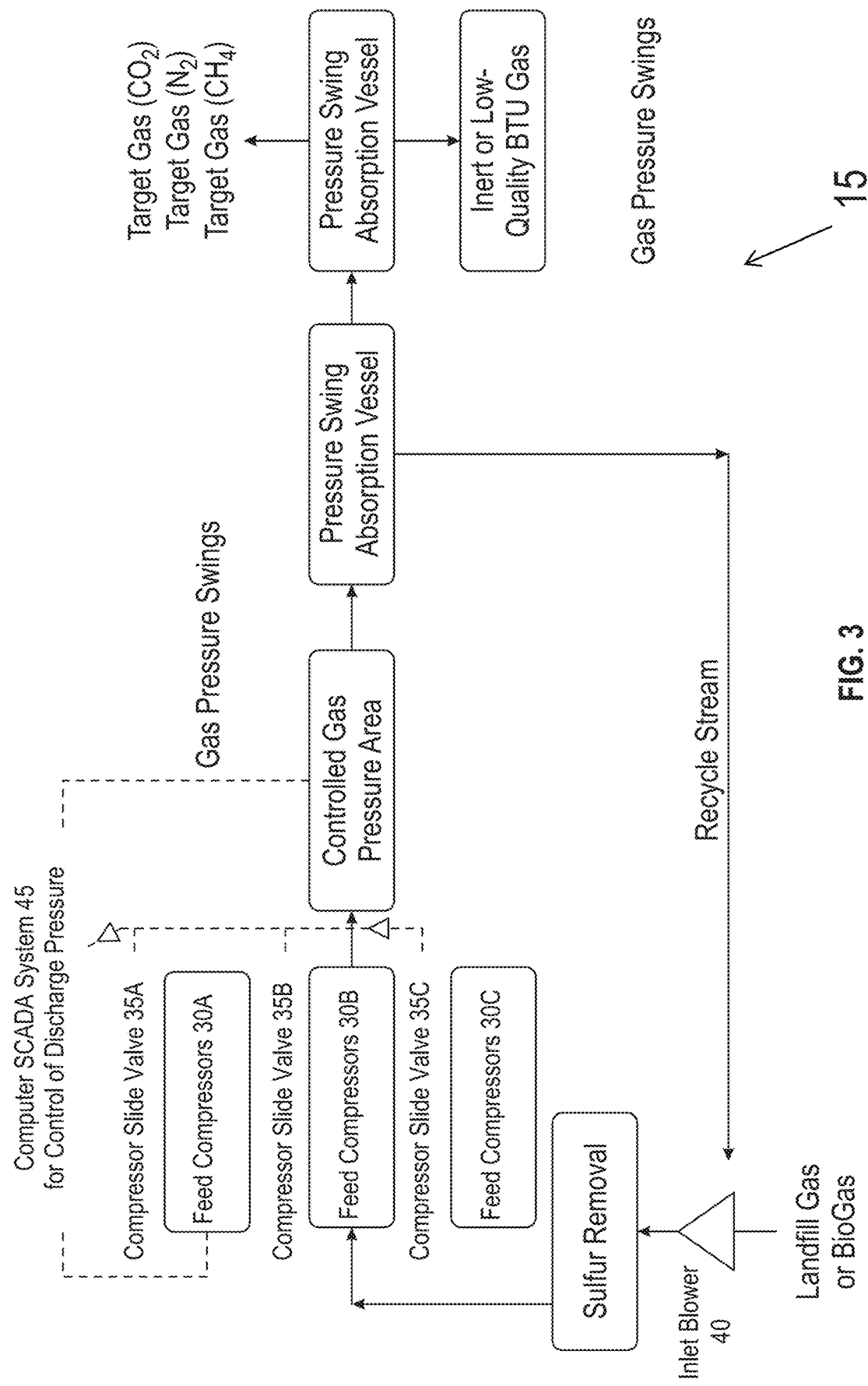
FIG. 3 is an example of a system and method for control of feed compressors operating in parallel in an RNG recovery facility for biogas or landfill gas with gas pressure swings and a controlled gas pressure area in accordance with an illustrative embodiment of the presently disclosed subject matter.
Figures 4, 4A:
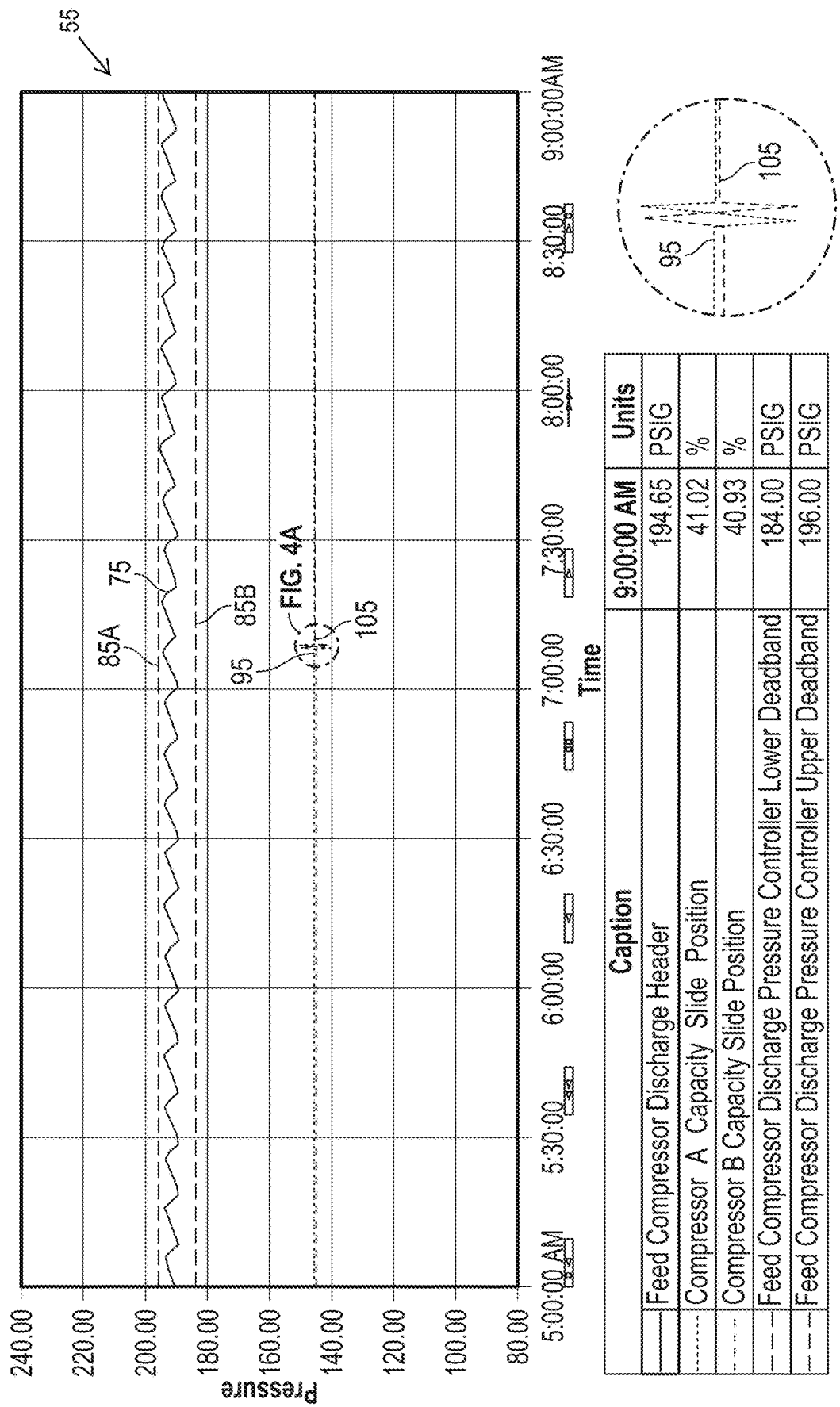
FIG. 4 is an example of a computerized operations screen for an RNG recovery facility for biogas or landfill gas with indicators for, e.g., discharge header pressure and compressor slide valve position in accordance with an illustrative embodiment of the presently disclosed subject matter.
FIG. 4A is an exploded view of feed compressor slide valve position information from FIG. 4 in accordance with an illustrative embodiment of the presently disclosed subject matter.
Figure 5:
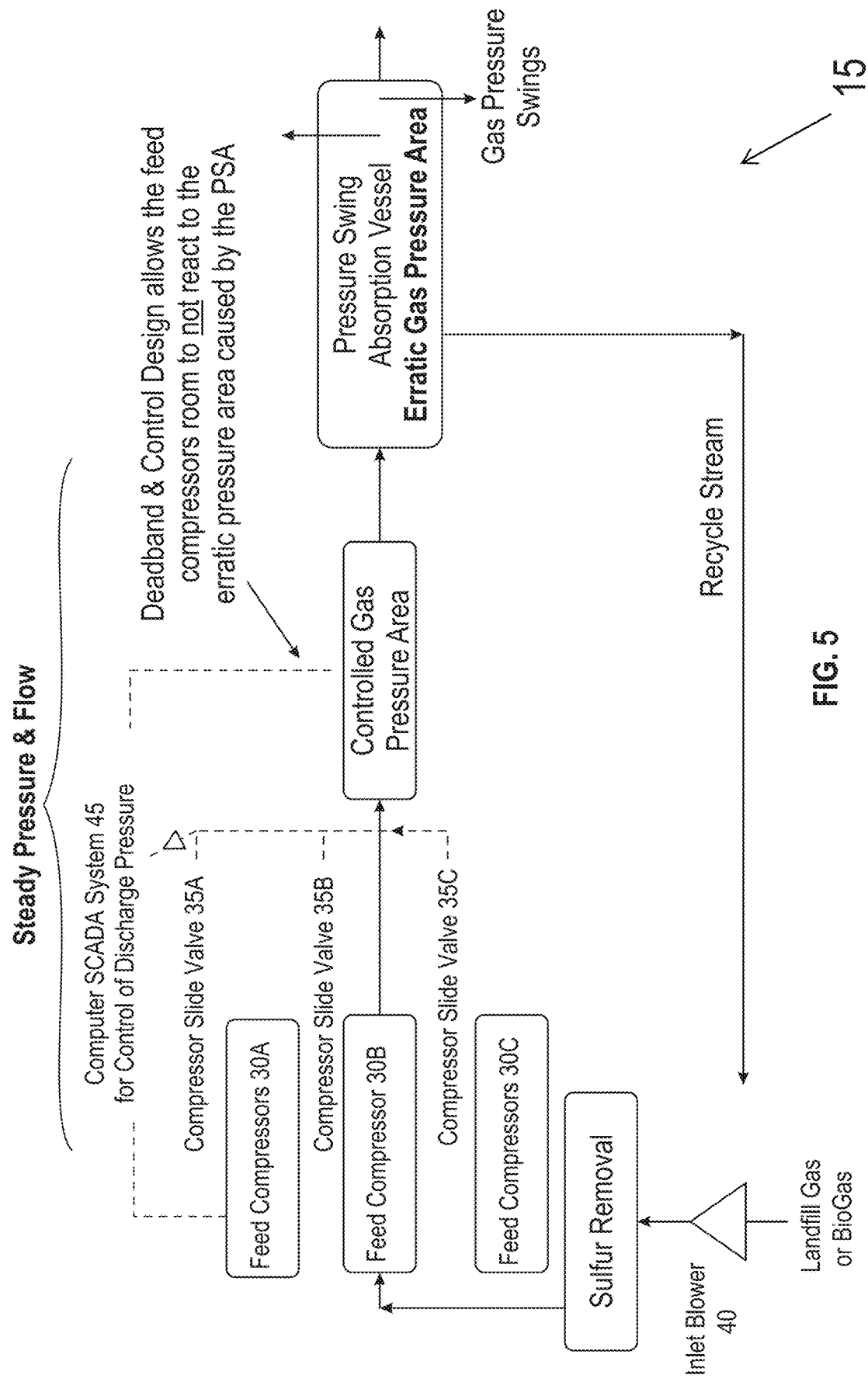
FIG. 5 is an example of a system and method for control of feed compressors operating in parallel in an RNG recovery facility for biogas or landfill gas with steady pressure and flow and a controlled gas pressure area in accordance with an illustrative embodiment of the presently disclosed subject matter.

In certain illustrative embodiments, a method for processing biogas and controlling the feed gas to a pressure swing adsorption (PSA) unit located in a landfill or biogas processing or gas separation facility is provided. A computer-based control system (SCADA) can monitor the active pressure (negative or positive) on the suction and discharge of the feed gas compressors. In FIG. 1, the feed gas compressors are located at step 30 labeled "Compression and chilling," which is subsequent to step 20 labeled "$H_2S$ Removal and Chilling" and step 10 labeled "Compression and cooling." Additional illustrative embodiments are shown in FIGS. 3-5.

In certain illustrative embodiments, a computer-based control system using supervisory control and data acquisition (SCADA) can control the feed gas compressors 30 by decreasing or increasing the compressor capacity based on a discharge pressure control. The discharge control utilizes a common discharge header pressure transmitter combined with a centralized PID (proportional-integral-derivative) control loop.

In certain illustrative embodiments, the gas stream can be compressed and liquids can be separated from the gas stream at elevated pressure and reduced temperature. The compressing can be performed using a plurality of compressors 30 operating in parallel with common control set points. A computer-based control system (SCADA) can be used to control the compressors 30, by decreasing or increasing the compressor capacity based on a discharge pressure control.

Figure 2:
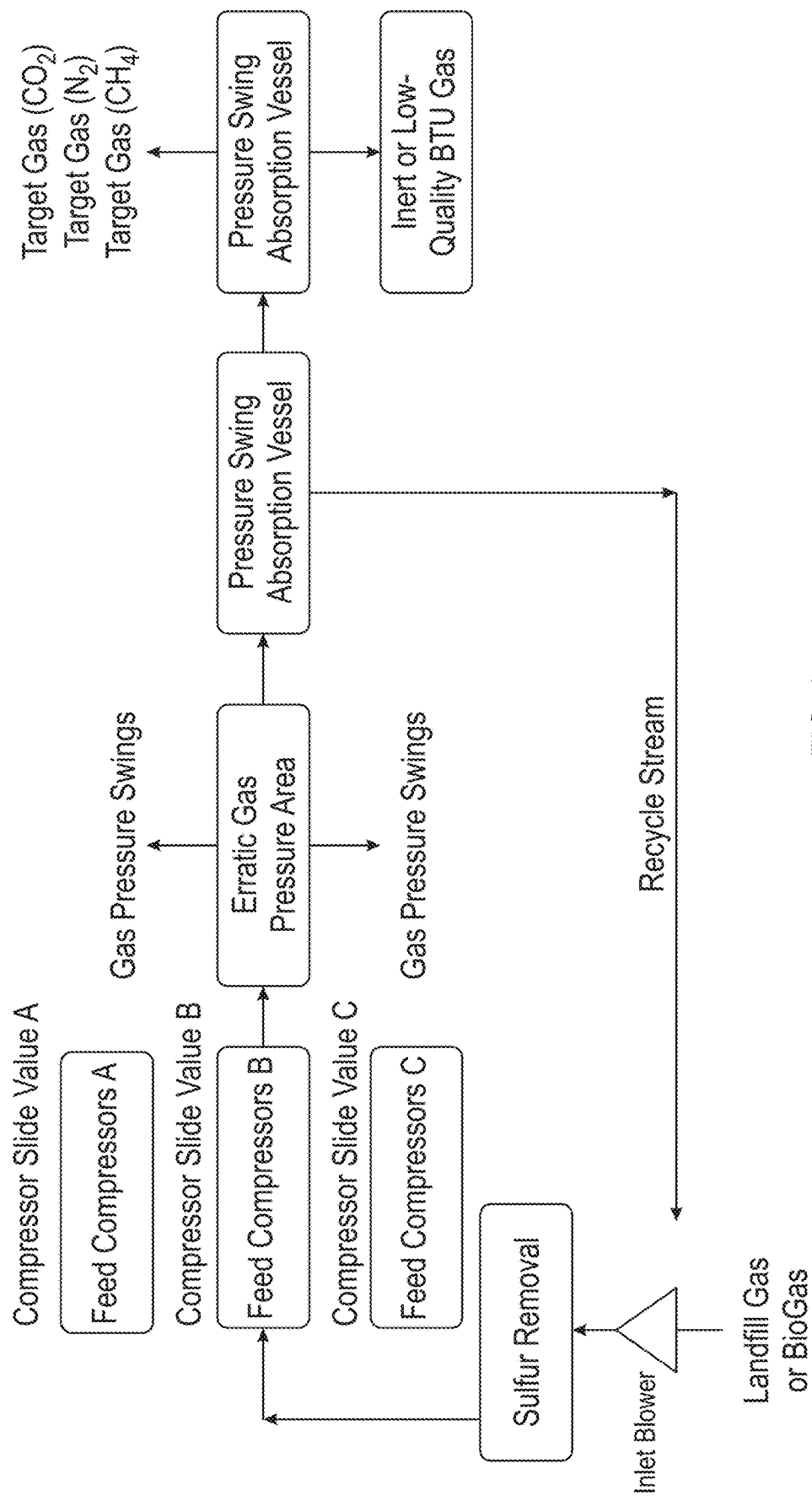
FIG. 2 is an example of an RNG recovery facility for biogas or landfill gas with gas pressure swings and an erratic gas pressure area.

An illustration of a typical prior design setup is shown in FIG. 2. Prior designs have left control points for compressor packages separate and distinct. This resulted in gas pressure swings and an erratic gas pressure area downstream of the feed compressors. Also, many prior designs operated on a controller/responder basis, whereby the controller compressor would be maxed out first, and then the responder compressor would trim. Also, prior designs would have multiple compressors that might have the same set point for a discharge pressure, but each compressor would be controlled based on its own individual discharge pressure transmitter. When there are multiple individual controls operating in parallel, they will often influence each other, and that causes them to continuously change their output. Fluctuations in the individual controls on each compressor can cause them to hunt for their individual pressure set points, which leads to system instability.

By comparison, in certain illustrative embodiments, a system and method 15 are provided whereby parallel compressors 30 can be operated with common control set points. An illustrative embodiment is shown in FIG. 3 (see feed compressors 30A, feed compressors 30B and feed compressors 30C linked by a common SCADA control system 45, although more or fewer compressors could be utilized with control system 45, as needed). Instead of each compressor 30A, 30B, 30C reacting individually to a change, such as in suction or discharge control, all of the compressors 30 react together to one pressure transmitter 55 (not shown) on a shared common discharge header 65 (not shown). The transmitter 55 sends a capacity command to each of the individual compressors 30A, 30B, 30C, instead of having an individual transmitter at each compressor. This leads to reduced competition between parallel compressor packages and improved reliability.

Additionally, standard industry practice has been to run the inlet blower 40 and 1st stage compression on vacuum control, which is susceptible to pressure swings. By comparison, in certain illustrative embodiments, the inlet blower 40 and 1st stage compressor can be run on discharge compressor control from the SCADA system which leads to improved reliability, run-time and stability. Discharge control reduces the amplitude of the pressure swings, allowing the inlet blowers to maintain a stable vacuum with smaller increases or decreases in speed, as large changes can negatively impact operation of the feed compressors and destabilize gas flow through the plant.

In certain illustrative embodiments, a specialized control scheme (SCADA) can be utilized for the feed compressors 30 to stabilize flow throughout the RNG recovery facility. The control scheme utilizes a pressure transmitter 55 (not shown) on a common discharge header 65 (not shown)

combined with a centralized PID control loop equipped with a deadband wide enough to allow the normal pressure swings to occur without changing the rate of flow through the plant.

In certain illustrative embodiments, feed compressors 30 can each have corresponding compressor slide valves 35. An illustrative embodiment is shown in FIG. 3 (see slide valves 35A for feed compressors 30A, slide valves 35B for feed compressors 30B and slide valves 35C for feed compressors 30C). Compressor slide valves 35 are used to regulate the volume capacity of the respective compressors 30. When the compressor slide valve 35 is held at a constant position, the feed compressor 30 is held to a certain volume capacity. Moving the compressor slide valve 35 will change the internal volume ratio and allow a user to increase or decrease flow to compressor 30 and adjust compression based on process conditions.

An illustrative embodiment of an operations screen 55 for a computer-based control system (SCADA) for an RNG recovery facility is shown in FIG. 4. Operations screen 55 is displaying pressure trends over time for feed compressors 30 on a common discharge header.

Solid line 75 is the header discharge pressure for feed compressors 30. The two dashed lines 85A and 85B represent the deadband boundary range for control. As long as the solid line 75 for discharge header pressure remains inside the deadband lines 85A and 85B, no changes are commanded to the compressor slide valves 35 to adjust volume capacity for feed compressors 30. In general, a larger volume capacity will require a larger deadband boundary range. If the peaks or valleys for solid line 75 were to make their way outside of the deadband boundary range within lines 85A and 85B, then the feed compressor 30 would be commanded to compensate for that, to bring solid line 75 back inside the deadband boundary range.

Lines 95 and 105 represent the commanded capacity for each compressor 30. In previous designs, these two lines 95 and 105 would have recognizable separation from one another, since they would reflect separate control points for the different compressors 30, whereas in the presently disclosed design, lines 95 and 105 have little to no separation, due to common control set points. The small up/down "squiggle" near the middle is intentionally commanded in order to keep the compressor slide valves 35 from getting stuck in one position. If compressor slide valves 35 are not moved occasionally, contaminates in the gas stream and/or general lack of movement that can cause compressor slide valves 35 to stick.

In certain illustrative embodiments, additional logic can be provided to briefly but purposefully move the compressor slide valves 35 (for example, jog the compressor slide valves 35 back and forth) if they have been stationary for an extended time period, for example, more than 8 hours. The compressor slide valves 35 only have to move occasionally under the presently disclosed control scheme, and so this forced movement can prevent the compressor slide valves 35 from getting stuck in position.

In certain illustrative embodiments, the compressor slide valve 35A is jogged in the opposite direction simultaneously from compressor slide valve 35B, to counteract the disruption in flow that moving the compressor slide valve 35 would normally cause. This is displayed in FIG. 4 (and in greater detail in FIG. 4A) by the upward/downward "squiggle" in line 95 and the downward/upward "squiggle" in line 105. In other words, the capacity represented by line 95 is initially greater, and the capacity represented by line 105 is initially lower, so that overall header discharge pressure is not affected.

An illustrative embodiment of the presently disclosed system and method 15 with steady pressure and flow and a controlled gas pressure area is shown in FIG. 5. Benefits of the presently disclosed system and method 15 can include the following: (i) consistent vacuum on the wellfield; (ii) consistent flow through the plant; (iii) the $CO_2$ removal system runs in a more consistent state; (iv) the nitrogen removal system is able to be tuned for more efficient operation; (v) the flow of waste gas to the thermal oxidizer is more consistent which prevents the unit from oscillating; and (vi) cost savings in reducing unit downtime and lost production.

Various illustrative embodiments of a system and method for recovering methane from a biogas-generating source are described herein. In certain illustrative embodiments, a method for recovering methane from a biogas-generating source is provided. At least one gas stream comprising a biogas from a biogas-generating source can be accessed. Sulfur can be removed from the gas stream. For purposes of removal of methane from biogas, the gas stream can be compressed to a pressure of at least 50 psig. For purposes of removal of $H_2S$, the gas stream can be compressed to a pressure of at least 5 psig. The gas stream can be chilled to less than 60 deg F. The gas stream can be compressed and liquids can be separated from the gas stream at elevated pressure and reduced temperature, wherein the compressing can be performed using a plurality of compressors operating in parallel with common control set points. A majority of trace contaminants can be separated from the gas stream through preferential adsorption of the trace contaminants. A majority of the carbon dioxide can be separated from the gas stream through preferential permeation of carbon dioxide through membranes. Nitrogen and oxygen can be separated from the gas stream through preferential adsorption of methane. Adsorbed methane can be released through depressurization. Adsorbed methane can be further released through use of vacuum compressors. A methane product can be recovered from the gas stream.

In certain aspects, each compressor in the plurality of compressors is located on a shared common discharge header, and the compressor capacity for each compressor can be based on a discharge pressure control from a pressure transmitter located on the shared common discharge header. The gas stream can be passed through an inlet blower prior to removing sulfur from the gas stream, and the inlet blower can be operated on discharge compressor control from the plurality of compressors. The gas stream can be directed to a landfill gas flare using one or more inlet blowers prior to removing sulfur from the gas stream. Gas samples taken from a plurality of locations in the process can be routed to a common set of monitoring instrumentation. After separating the majority of the carbon dioxide from the gas stream to produce a tailgas stream, the tailgas stream can be directed to a thermal oxidizer or flare the methane content in the tailgas stream can be monitored. One or more equipment units in the process can be depressurized to a common vacuum header. The entire methane product stream can be directed to a method flare having a continuous pilot.

Various illustrative embodiments of a system and method for control of feed compressors in an RNG recovery facility for biogas or landfill gas are also disclosed herein. In certain illustrative embodiments, a method of controlling compressor operations for a plurality of feed compressors in a facility for treating biogas to recover renewable natural gas is provided. The plurality of feed compressors can be aligned to operate in parallel on a shared common discharge header. The compressor capacity can be regulated for each feed compressor using a pressure transmitter located on the shared common discharge header. The regulating can be performed by a computer-based control system using supervisory control and data acquisition. The shared common discharge header can be maintained at a header discharge pressure that is within a predetermined deadband boundary range. The maintaining can be performed by a computer-based control system using supervisory control and data acquisition. A compressor slide valve on each feed compressor can be maintained at a stationary position. The header discharge pressure can be monitored, and if the header discharge pressure goes outside of the predetermined deadband boundary range, the position of the compressor slide valve on each feed compressor can be changed or moved from the stationary position to a position that increases or decreases gas flow to the feed compressor. The changing or moving can be performed by a computer-based control system using supervisory control and data acquisition. A compressor slide valve on each feed compressor can be maintained at a first position. The position of the compressor slide valve on each feed compressor can be changed from the first position to a second position after a predetermined period of time to jog the valve and prevent sticking, and then immediately returned to the first position. The plurality of feed compressors can include a first feed compressor and a second feed compressor. The position of the compressor slide valve on the first feed compressor can be changed from the first position to the second position. The position of the compressor slide valve on the second feed compressor can be from the first position to the second position. The changing of the position of the compressor slide valve for the first feed compressor and the second feed compressor can be in opposite directions, to counter any flow disruption and not affect overall header discharge pressure.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims

What is claimed is:

1. A method for recovering methane from a biogas-generating source, comprising:
   accessing at least one gas stream comprising a biogas from a biogas-generating source;
   removing sulfur from the gas stream;
   compressing the gas stream;
   chilling the gas stream to less than 60 deg F.;
   compressing the gas stream and separating liquids from the gas stream at elevated pressure and reduced temperature, wherein the compressing is performed using a plurality of compressors operating in parallel with common control set points;
   separating a majority of trace contaminants from the gas stream through preferential adsorption of the trace contaminants;
   separating a majority of the carbon dioxide from the gas stream through preferential permeation of carbon dioxide through membranes;
   separating nitrogen and oxygen from the gas stream through preferential adsorption of methane;
   releasing adsorbed methane through depressurization;
   further releasing adsorbed methane through use of vacuum compressors; and
   recovering a methane product from the gas stream.

2. The method of claim 1, wherein each compressor in the plurality of compressors is located on a shared common discharge header, and the compressor capacity for each compressor is based on a discharge pressure control from a pressure transmitter located on the shared common discharge header.

3. The method of claim 1, wherein the gas stream is passed through an inlet blower prior to removing sulfur from the gas stream, and wherein the inlet blower is operated on discharge compressor control from the plurality of compressors.

4. The method of claim 1, further comprising: directing the gas stream to a landfill gas flare using one or more inlet blowers prior to removing sulfur from the gas stream.

5. The method of claim 1, further comprising: routing gas samples taken from a plurality of locations in the process to a common set of monitoring instrumentation.

6. The method of claim 1, further comprising: after separating the majority of the carbon dioxide from the gas stream to produce a tailgas stream, directing the tailgas stream to a thermal oxidizer or flare and monitoring the methane content in the tailgas stream.

7. The method of claim 1, further comprising: depressurizing one or more equipment units in the process to a common vacuum header.

8. The method of claim 1, further comprising: directing the entire methane product stream to a method flare having a continuous pilot.

* * * * *